US009389475B2

(12) United States Patent
Lo

(10) Patent No.: US 9,389,475 B2
(45) Date of Patent: Jul. 12, 2016

(54) MATRIX SUBSTRATE AND LIQUID CRYSTAL DISPLAY DEVICE

(71) Applicant: Shenzhen China Star Optoelectronics Technology Co., Ltd., Shenzhen, Guangdong (CN)

(72) Inventor: Shih-Hsun Lo, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 164 days.

(21) Appl. No.: 13/878,758

(22) PCT Filed: Mar. 29, 2013

(86) PCT No.: PCT/CN2013/073442
§ 371 (c)(1),
(2) Date: Apr. 11, 2013

(87) PCT Pub. No.: WO2014/153771
PCT Pub. Date: Oct. 2, 2014

(65) Prior Publication Data
US 2014/0293181 A1    Oct. 2, 2014

(30) Foreign Application Priority Data
Mar. 27, 2013  (CN) .......................... 2013 1 0102375

(51) Int. Cl.
G02F 1/1362    (2006.01)

(52) U.S. Cl.
CPC ................................ *G02F 1/136286* (2013.01)

(58) Field of Classification Search
CPC .............. G02F 1/136286; G02F 2001/134345; G02F 1/134336
See application file for complete search history.

(56) References Cited

U.S. PATENT DOCUMENTS

| 2008/0068524 | A1 | 3/2008 | Kim | |
|---|---|---|---|---|
| 2011/0018910 | A1* | 1/2011 | Chai et al. | 345/690 |
| 2012/0162278 | A1* | 6/2012 | Cheng et al. | 345/690 |

FOREIGN PATENT DOCUMENTS

| CN | 102184722 A |   | 9/2011 |
|---|---|---|---|
| CN | 102184722 A | * | 9/2011 |
| CN | 102236233 A |   | 11/2011 |

* cited by examiner

*Primary Examiner* — Jessica M Merlin
(74) *Attorney, Agent, or Firm* — Andrew C. Cheng

(57) ABSTRACT

The present invention discloses a matrix substrate and a liquid crystal display device. When the scan line set comprises at least three scan lines, a part of data lines is bended from one side of the pixels corresponding to a same column to another side between two adjacent pixels such that the thin film transistor of each of the pixels can be connected to a nearest data line. This prevents the data lines from interfering with the pixel electrode, and raises the charging time by turning on at least three scan lines simultaneously.

4 Claims, 4 Drawing Sheets

MATRIX SUBSTRATE AND LIQUID CRYSTAL DISPLAY DEVICE

BACKGROUND OF THE INVENTION

1. Field of the Invention

The invention relates to a liquid crystal display, and more particularly, to a matrix substrate and a liquid crystal display device having a matrix substrate.

2. Description of the Prior Art

In nowadays, an equipment having TFT-LCD (Thin Film Transistor-Liquid Crystal Display) is able to display FHD (Full High Definition) images, and its resolution has reached 1920×1080. Some other equipments can support higher display demands, for example, an equipment having 3D display effect can support QFHD (Quad Full High Definition) display effect. It means that the definition can reach 3840×2160 or 4000×2000 such that 4 FHD images can be displayed on a single screen.

However, in contrast to FHD, when the frame rate is 60 Hz or 120 Hz, QFHD has only ½ or ¼ effective charging time to charge pixel electrodes. Conventionally, two scan lines of the matrix substrate can be turned on simultaneously and the number of data lines can be increased correspondingly in order to compensate for the above-mentioned short effective charging time. Please refer to FIG. 1, which is a diagram showing a part of matrix substrate according to the related art. As shown in FIG. 1, the matrix substrate comprises a plurality of pixels 11. Each pixel 11 comprises a pixel electrode 101 and a thin film transistor 102. The scan line G01 and G02 are tuned on/off at the same time. The data lines D01 and D02 are positioned on both sides of pixels 11 corresponding to a same row. Two scan line G01 and G02 are electrically connected to the data lines D01 and D02 through TFTs 102 of the pixels 11. When the scan lines G01 and G02 are turned on at the same time, the charging time of the pixel electrode 101 can be increased.

However, if the effective charging time becomes ¼ of ordinary charging time, three scan lines need to be turned on simultaneously and three data lines should be correspondingly positioned around the pixels corresponding to a same row. If the data lines are arranged as straight lines, the data lines may cross the pixel electrodes of pixels to interfere with the pixel electrodes of pixels.

SUMMARY OF THE INVENTION

It is therefore one of the primary objectives of the claimed invention to provide a matrix substrate and a related liquid crystal display, to prevent data lines from interfering pixel electrodes when the three-scan-line configuration is adopted, and to further solve the above-mentioned problem.

According to an exemplary embodiment of the claimed invention, a matrix substrate is disclosed. The matrix substrate comprises a plurality of pixels arranged in a matrix including a plurality of rows and a plurality of columns. Each of the pixels comprises a pixel electrode and a thin-film transistor. A drain of the thin-film transistor is electrically connected to the pixel electrode. The matrix substrate further comprises a plurality scan line sets and a plurality of data line sets, wherein the scan line sets and the data line sets are insulated and intercrossed. Each of the scan line sets comprises three scan lines extended along a row direction. Each scan line of the three scan lines connected to a gate of the thin film transistor in the pixel of a corresponding row. Each of the scan line of the scan line sets receives a scanning signal simultaneously to turn on/off the thin-film transistor of the corresponding row. Each of the data line set respectively comprises a number of data lines, wherein the number is corresponding to a number of scan lines in a scan line set. Each source of the thin film transistor of each pixel corresponding to a same column is connected to a corresponding data line of a same data line set. Two data lines corresponding to the first scan line and the third scan line of the three scan lines are extended along a column direction and on two sides of the pixels corresponding to a same column, wherein a data line corresponding to the second scan line of the three scan lines of the data line set is extended along the column direction but is bended from one side of a corresponding pixel to another side of the corresponding pixel at a position between the corresponding, pixel and a pixel next to the corresponding pixel in the column direction such that the thin film transistor of each pixel is connected to a nearest data line and the data lines do not interfere with corresponding pixels. The data line corresponding to the second scan line of the three scan lines at least comprises sequentially-connected a first part, a second part, and a third part, wherein the first part and the third part are respectively extended along the column direction and positioned on the two sides of the corresponding pixel, and the second part is extended along the column direction and positioned between the corresponding pixel and the pixel next to the corresponding pixel in the column direction such that the second part is connected to the first part and the third part.

In one aspect of the present invention, the first scan line, the second scan line, and the third scan line are short-circuit together and receive the scanning signal.

In another aspect of the present invention, the first scan line, the second scan line, and the third scan line respectively receive a scanning signal.

In yet another aspect of the present invention, each of the scan line set further comprises a fourth scan line extended along the row direction, the fourth scan line receives the scanning signal, a data line corresponding to the fourth scan line is extended along the column direction, a data line corresponding to the third scan line is extended along the column direction, the data line corresponding to the third scan line is bended before a pixel corresponding to the fourth scan line, and the data line corresponding to the third scan line is bended without crossing a data line corresponding to the second scan line.

According, to another exemplary embodiment of the claimed invention, a matrix substrate is disclosed. The matrix, substrate comprises a plurality of pixels arranged in a matrix including a plurality of rows and a plurality of columns. Each of the pixels comprises a pixel electrode and a thin-film transistor. A drain of the thin-film transistor is electrically connected to the pixel electrode. The matrix substrate further comprises a plurality scan line sets and a plurality of data line sets, wherein the scan line sets and the data line sets are insulated and intercrossed. Each of the scan line sets comprises three scan lines extended along a row direction. Each scan line of the three scan lines connected to a gate of the thin film transistor in the pixel of a corresponding row. Each of the scan line of the scan line sets receives a scanning signal simultaneously to turn on/off the thin-film transistor of the corresponding row. Each of the data line set respectively comprises a number of data lines, wherein the number is corresponding to a number of scan lines in a scan line set. Each source of the thin film transistor a each pixel corresponding to a same column is connected to a corresponding data line of a same data line set. A part of data lines of each of the data line sets is extended along the column direction but is bended from one side of a corresponding pixel to another side of the corresponding pixel at a position between the corresponding pixel and a pixel next to the corresponding pixel in the column direction such that the thin film transistor of each pixel is connected to a nearest data line.

In one aspect of the present invention, the part of the data lines at least comprises sequentially-connected a first part, a second part, and a third part, wherein the first part and the third part are respectively extended along the column direction and positioned on the two sides of the corresponding pixel, the second part is extended along the column direction and positioned between the corresponding pixel and the pixel next to the corresponding pixel in the column direction such that the second part is connected to the first part and the third part.

In another aspect of the present invention, the number of the scan lines in each of the scan line sets is three, two data lines corresponding to the first scan line and the third scan line of the three scan lines are extended along a column direction and on two sides of the pixels corresponding to a same column, wherein a data line corresponding to the second scan line of the three scan lines of the data line set is extended along the column direction but is bended from the one side of the corresponding pixel to another side of the corresponding pixel at the position between the corresponding pixel and the pixel next to the corresponding pixel in the column direction such that the thin film transistor of each pixel is connected to the nearest data line and the data lines do not interfere with corresponding pixels.

In another aspect of the present invention, the first scan line, the second scan line, and the third scan fine are short-circuit together and receive the scanning signal.

In still another aspect of the present invention, the first scan line, the second scan line, and the third scan line respectively receive a scanning signal.

In yet another aspect of the present invention, each of the scan line set further comprises a fourth scan line extended along the row direction, the fourth scan line receives the scanning signal, a data line corresponding to the fourth scan line is extended along the column direction, a data line corresponding to the third scan line is extended along the column direction, the data line corresponding to the third scan line is bended before a pixel corresponding to the fourth scan line, and the data line corresponding to the third scan line is bended without crossing a data line corresponding to the second scan line.

According to another exemplary embodiment of the claimed invention, a liquid crystal display is disclosed. The liquid crystal display comprises a matrix substrate. The matrix substrate comprises a plurality of pixels arranged in a matrix including a plurality of rows and a plurality of columns. Each of the pixels comprises a pixel electrode and a thin-film transistor. A drain of the thin-film transistor is electrically connected to the pixel electrode. The matrix substrate further comprises a plurality scan line sets and a plurality of data line sets, wherein the scan line sets and the data line sets are insulated and intercrossed. Each of the scan line sets comprises three scan lines extended along a row direction. Each scan line of the three scan lines connected to a gate of the thin film transistor in the pixel of a corresponding row. Each of the scan line of the scan line sets receives a scanning signal simultaneously to turn on/off the thin-film transistor of the corresponding row. Each of the data line set respectively comprises a number of data lines, wherein the number is corresponding to a number of scan lines in a scan line set. Each source of the thin film transistor of each pixel corresponding to a same column is connected to a corresponding data hue of a same data line set. A part of data lines of each of the data line sets is extended along the column direction but is bended from one side of a corresponding pixel to another side of the corresponding pixel at a position between the corresponding pixel and a pixel next to the corresponding pixel in the column direction such that the thin film transistor of each pixel is connected to a nearest data line.

In one aspect of the present invention, the part of the data lines at least comprises sequentially-connected a first part, a second part, and a third part, wherein the first part and the third part are respectively extended along the column direction and positioned on the two sides of the corresponding pixel, the second part is extended along the column direction and positioned between the corresponding pixel and the pixel next to the corresponding pixel in the column direction such that the second part is connected to the first part and the third part.

In another aspect of the present invention, the number of the scan lines in each of the scan line sets is three, two data lines corresponding to the first scan line and the third scan line of the three scan lines are extended along a column direction and on two sides of the pixels corresponding to a same column, wherein a data line corresponding to the second scan line of the three scan lines of the data line set is extended along the column direction but is bended from the one side of the corresponding pixel to another side of the corresponding pixel at the position between the corresponding pixel and the pixel next to the corresponding pixel in the column direction such that the thin film transistor of each pixel is connected to the nearest data line and the data lines do not interfere with corresponding pixels.

In another aspect of the present invention, the first scan line, the second scan line, and the third scan line are short-circuit together and receive the scanning signal.

In still another aspect of the present invention, the first scan line, the second scan line, and the third scan line respectively receive a scanning signal.

In yet another aspect of the present invention, each of the scan line set further comprises a fourth scan line extended along the row direction, the fourth scan line receives the scanning signal, a data line corresponding to the fourth scan line is extended along the column direction, a data line corresponding to the third scan line is extended along the column direction, the data line corresponding to the third scan line is bended before a pixel corresponding to the fourth scan line, and the data line corresponding to the third scan line is bended without crossing a data line corresponding to the second scan line.

The present invention matrix substrate and liquid crystal display bends a part of data lines from one side of a corresponding pixel to another side between the corresponding pixel and a next pixel in the column direction such that the thin film transistor of each pixel can be connected to a nearest data line. In this way, the data line does not interfere with the pixel electrode. Therefore, the present invention can turn on three scan lines to raise the charging time.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
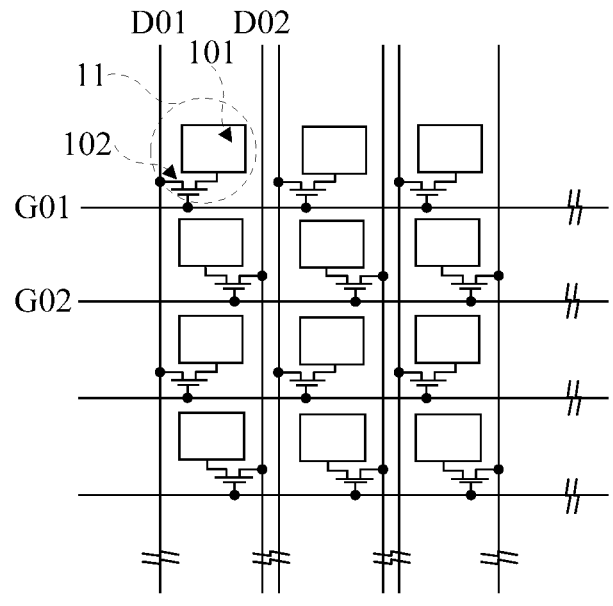
FIG. 1 is a diagram showing a part of a conventional matrix substrate.
Figure 2:
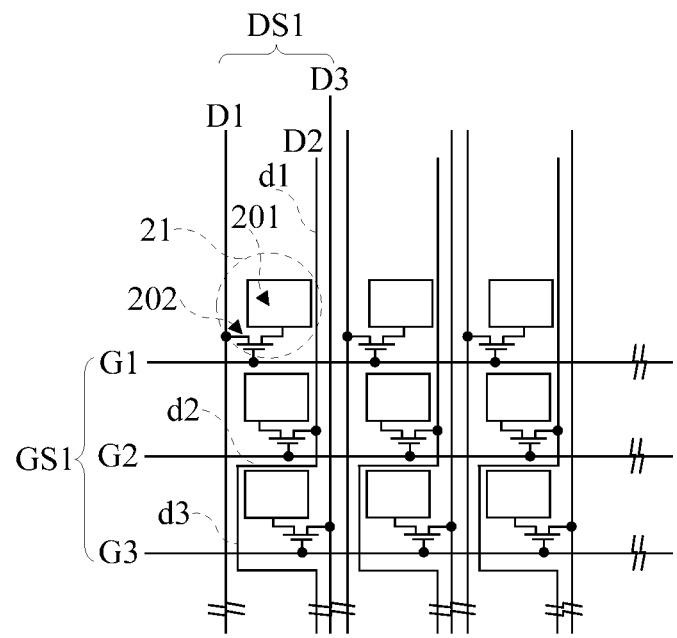
FIG. 2 is a diagram showing a pan of a matrix substrate according to a first embodiment of the present invention.

Please refer to FIG. 2, which is a diagram showing a part of a matrix substrate according to a first embodiment of the present invention. The matrix substrate comprises a plurality of pixels 21 arranged in a matrix including a plurality of rows and columns. The pixel 21 comprises a pixel electrode 201 and a thin film transistor 202. The pixel electrode 201 is charged by turning on/off the thin film transistor 202.

The matrix substrate further comprises a plurality of scan line sets GS1 and a plurality of data line sets DS1, where the scan line sets GS1 and the data line sets DS1 are insulated and intercrossed. Each of the scan line set GS1 comprises three scan lines G1, G2, and G3 extended along the row direction. Each of the data line sets DS1 comprises three data lines D1, D2, and D3, where the number of the data lines is corresponding to the number of the scan lines in the scan line set GS1.

The pixel electrode 201 of each pixel 21 is electrically connected to a corresponding data line and a corresponding scan line through the thin film transistor 202. Specifically, the drain of the thin film transistor 202 is connected to the pixel electrode 201. Each of the scan lines G1, G2, and G3 is connected to gates of thin film transistors 202 of pixels of a row. Sources of thin film transistors 202 of pixels 21 of a same column are electrically connected to corresponding data lines D1, D2, and D3 of a corresponding data line set DS1.

Each of the scan lines G1, G2, and G3 receives a scanning signal at the same time to turn on/off the TFTs 202 of pixels corresponding to different rows 21. That is, the pixel electrodes 201 of pixels 21 of different rows 21 are charged at the same time. In this embodiment, the first scan line G1, the second scan line G2, and the third scan line G3 are short-circuit together such that they receive the scanning signal simultaneously. In another embodiment, the first scanning line G1, the second scan line G2, and the third an line G3 respectively receives a scanning signal. For example, the scan lines G1, G2, and G3 are connected to three output ports of a control chip and the control chip can control the three output ports to output the scanning signals through the three output ports simultaneously.

The data line D2 of the data line set DS1 is bended from one side of a corresponding pixel 21 to another side of the corresponding pixel 21 at a position between the corresponding pixel 21 and a next pixel 21 in the column direction. This makes the thin film transistor 202 of each pixel connect to a nearest data lines D1, D2, and D3. Specifically, taking pixels 21 of a first column, the two data lines D1 and D3 corresponding to the first scan line G1 and the third scan line G3 arc extended along the column direction and positioned on two sides of the pixels 21 of the first column. The pixel 21 of the first row is connected to the nearest data line D1. The pixel 21 of the second row is connected to the nearest data line G2. In this embodiment, if the data line D2 is not bended, then the data line D2 will be the nearest data line of the pixel 21 of the third row, not the data line D3. However, the pixel 21 of the third row should be connected to the data line D3. Therefore, in this embodiment, the second data line D2 corresponding to the second scan fine G2 is betided, and the pixel 21 of the third row is connected to the nearest data line D3. In this way, the data lines D1, D2, and D3 do not cross the pixel electrodes 201 and do not interfere with their corresponding pixel electrodes 21.

In this embodiment, the data line D2 at least comprises sequentially-connected a first part d1, a second part d2, and a third part d3. The first part d1 and the third part d3 are extended along the column direction and respectively positioned on the right side and the left side of a corresponding pixel 21. The second part d2 is extended along the row direction and positioned between the corresponding pixel 21 and the pixel 21 next to the corresponding pixel in the column direction such that the second part d2 is connected to the first part d1 and the third part d3. The second part d2 can be positioned between the pixel 21 of the first row and the pixel 21 of the second row 21, or be positioned between the pixel 21 of the second row and the pixel 21 of the third row.

Figure 3:
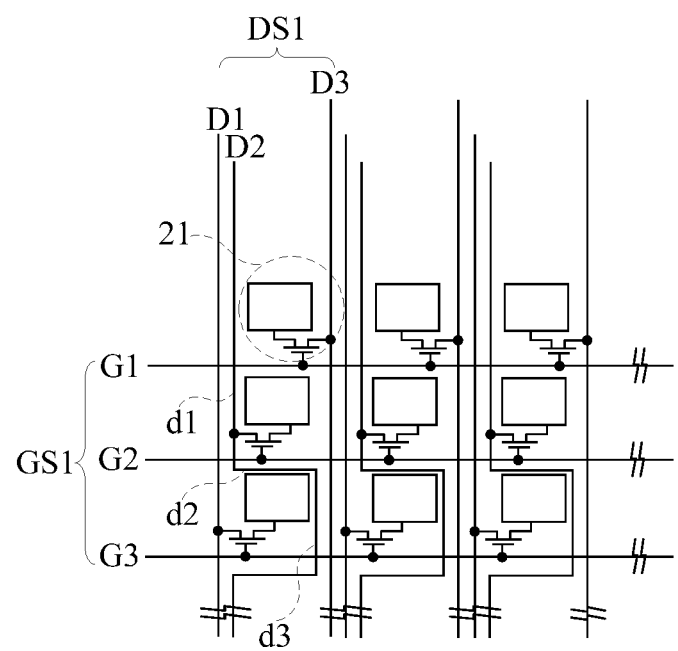
FIG. 3 is a diagram showing a part of a matrix substrate according to a second embodiment of the present invention.

Please refer to FIG. 3, which is a diagram showing a part of a matrix substrate according to a second embodiment of the present invention. The difference between the second embodiment and the first embodiment is: the data line D3 corresponding to the first scan line G1 is positioned on the right side of the pixel 21 of the first row and is electrically connected to the pixel 21 of the first row. The data line D1 of the third scan line G3 is positioned on the left side of the pixel 21 of the third row and is electrically connected to the pixel 21 of the third row. The first part d1 and the third part d3 of the data line D2 corresponding to the second scan line G2 are extended along the column direction and positioned on two sides of the corresponding pixel 21, and the second part d2 is connected to the first part d1 and the third part d3.

Please note, in the first embodiment and second embodiment, the data lines D1, D2, and D3 of the data line set DS1 correspond to pixels of different rows, and the data line D2 is bonded such that it may change the extended direction. However, one having ordinary skills can understand another matrix substrate by combining, the spirits of the first embodiment and the second embodiment. This changes also obeys the spirit of the present invention.

Figure 4:
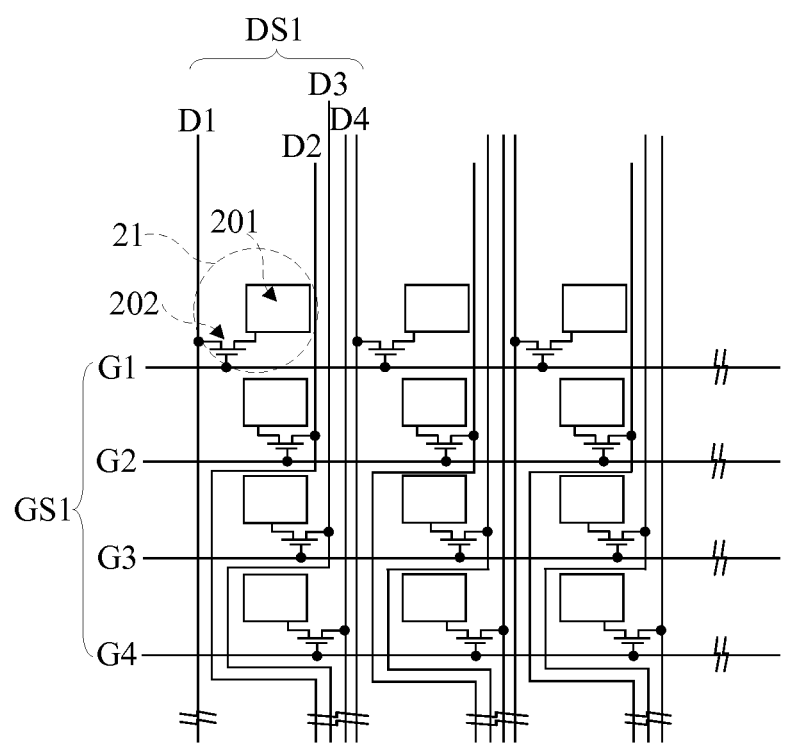
FIG. 4 is a diagram showing a part of a matrix substrate according to a third embodiment of the present invention.

Please refer to FIG. 4, which is a diagram showing a part of a matrix substrate according to a third embodiment of the present invention. The difference between the third embodiment and the first embodiment is: the scan line set GS1 further comprises a fourth scan line G4 extended along the row direction and positioned next to the third scan line G3, and a data line D4 is corresponding to the scan line G4.

The fourth scan line G4 is connected to gates of thin film transistors 202 of pixels corresponding to a same row. The data line D4 corresponding to the fourth scan line G4 is connected to sources of pixels corresponding to a same column. The drain of thin film transistor 202 is connected to the pixel electrode 201. Each of the scan lines G1, G2, G3, and G4 receives a scanning signal at the same time to turn on/off the thin film transistors 202 of pixels.

The data line D4 corresponding, to the fourth scan line (114 is extended along the column direction and is not bended. Similar to the data line 132, the data line D3 is extended along the column direction but is bonded before the pixel 21 corresponding to the fourth scan line G4. That is, the data line D3 is bended between the pixel 21 of the third row and a next pixel 21 in the column direction. In this embodiment, the data line D2 is bended between the pixel 21 of the second row and the pixel of the third row, and the data fine D3 is bended between the pixel 21 of the third row and the pixel of the fourth row. In another embodiment, the data line D2 can be bended between the pixel 21 of the first row and the pixel 21 of the second row, and the data line D3 can be bended between the pixel 21 of the second row and the pixel 21 of the third row.

Or, the data line D2 can be betided between the pixel 21 of the first row and the pixel 21 of the second row, and the data line D3 can be bended between the pixel 21 of the third row and the pixel 21 of the fourth row.

Figure 5:
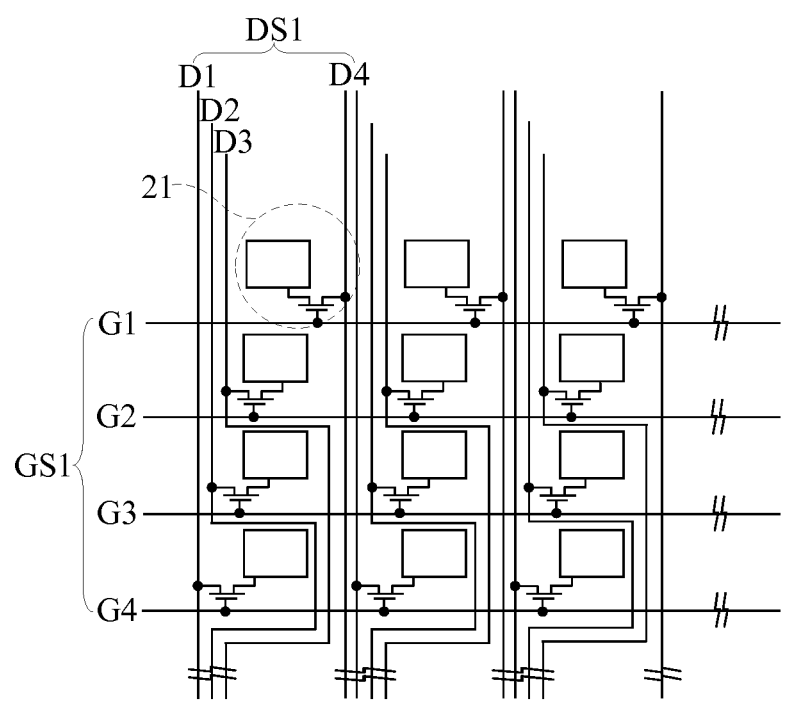
FIG. 5 is a diagram showing a part of a matrix substrate according to a fourth embodiment of the present invention.

Please refer to FIG. 5, which is a diagram showing a part of a matrix substrate according to a fourth embodiment of the present invention. The difference between the fourth embodiment and the third embodiment is: the pixels corresponding to the data lines D1, D2, D3, and D4 of the data line set DS1 are different.

Taking the pixels 21 of the first column as an example, the data line D4 is extended along, the column direction, is positioned on the right side of the pixel 21 of the first column, and is electrically connected to the pixel 21 of the first row and the first scan line G1. The data line D1 is extended along the column direction, is positioned on the left side of the pixel 21 of the first column, and is electrically connected to the pixel 21 of the fourth row and the fourth scan line G4. The data line D2 is extended along the column direction, is positioned on the left side in the beginning, is betided from the left side to the right side at the position between the pixel 21 of the third row and the pixel 21 of the fourth row, and is electrically connected to the third scan line G3 and the pixel 21 of the third row when it is being bonded. The data line D3 is extended along the column direction, is positioned on the left side in the beginning, is bonded from the left side to the right side at the position between the pixel 21 of the second row and the pixel 21 of the third row, and is electrically connected to the second scan line G2 and the pixel 21 of the second row when it is being bended.

Similar to the second embodiment, the data lines D2 and D3 can be bended in different positions. For example, each of them can be bended between the pixel 21 of the first row and the pixel 21 of the second row, the pixel 21 of the second row and the pixel of the third row, and the pixel 21 of the third row and the pixel of the fourth row. In other words, the data line D2 or the data line D3 can be bended in one of the above-mentioned positions, and these all obey the spirit of the present invention.

Please note, in the third embodiment and the fourth embodiment, the data lines D1-D4 of the data line set DS1 correspond to pixels of different rows, and the data lines D2 and D3 are betided in different positions. However, one having ordinary skills can understand another matrix substrate by combining the spirits of the first embodiment and the second embodiment. This change also obeys the spirit of the present invention.

In addition, in the above-mentioned embodiments, the scan line set GS1 only comprises three or four scan lines to receive the scanning signal. Please note, the number of the scan lines is not limited. That is, the scan line GS1 can comprise more than four scan lines. In other words, the present invention scan line set GS1 can comprise more than three scan lines, and the data line set DS1 correspondingly comprises more than three data lines. For example, in contrast to the first embodiment, in the third embodiment, when the fourth scan line G4 is added, one more data line is added and the data line D3 is bended. In this way, as long as there is enough space for placing and bending the data lines, the number of the scan lines and data lines is not limited.

The present invention further discloses a liquid crystal display device, where the liquid crystal display device comprises the above-mentioned matrix substrate.

Through the above-mentioned configurations, in the present invention matrix substrate and the liquid crystal display device, when the scan line set comprises at least three scan lines, a part of data lines is bended from one side to another side at a position between two adjacent pixels such that the thin film transistor of each of the pixels can be connected to a nearest data line. This prevents the data line from interfering with the pixel electrode, and further raises the charging time. In this way, the resolution can reach 4000× 2000 or more.

Those skilled in the ail will readily observe that numerous modifications and alterations of the device may be made while retaining the teachings of the invention. Accordingly, the above disclosure should be construed as limited only by the metes and bounds of the appended claims.

What is claimed is:

1. A matrix substrate, comprising a plurality of pixels arranged in a matrix including a plurality of rows and a plurality of columns, each of the pixels comprising a pixel electrode and a thin-film transistor, a drain of the thin-film transistor electrically connected to the pixel electrode, the matrix substrate further comprising a plurality scan line sets and a plurality of data line sets, wherein the scan line sets and the data line sets are insulated and intercrossed, each of the scan line sets comprises at least three scan lines extended along a row direction, each scan line of the at least three scan lines connected to a gate of the thin film transistor in the pixel of a corresponding row, each of the scan lines of the scan line sets receives a scanning signal simultaneously to turn on/off the thin-film transistor of the corresponding row, each of the data line sets respectively comprises a first data line, a second data line, a third data line, and a fourth data line, wherein a source of the thin film transistor of each of the pixels corresponding to a same column is connected to a corresponding data line of a same data line set, and the pixels electrically coupled to the same data line set are arranged in the same column, a part of data lines of each of the data line sets is extended along the column direction but is bended from one side of a corresponding pixel to another side of the corresponding pixel at a position between the corresponding pixel and a pixel next to the corresponding pixel in the column direction such that the thin film transistor of each pixel is connected to a nearest data line, wherein a first pixel, a second pixel, a third pixel, and a fourth pixel aligning along the column direction constitute a pixel set; the first data line is located at a first side of the pixel set; the second data line is at a second side of the pixel set and is bended from the second side to the first side at a position between the second pixel and the third pixel, and is bended from the first side to the second side of the pixel set at a position between the fourth pixel and a first pixel of another data set; the third data line is at the second side of the pixel set and is bended from the second side to the first side of the pixel set at a position between the third pixel and the fourth pixel, and is bended from the first side to the second side of the pixel set at a position between the fourth pixel and the first pixel of another data set; the fourth data line is located at the second side of the pixel set, a part of data lines of each of the data line sets is extended along the column direction but is bended from one side of a corresponding pixel to another side of the corresponding pixel at a position between the corresponding pixel and a pixel next to the corresponding pixel in the column direction.

2. The matrix substrate of claim 1, wherein the part of the data lines at least comprises sequentially-connected a first part, a second part, and a third part, wherein the first part and the third part are respectively extended along the column direction and positioned on the two sides of the corresponding pixel, the second part is extended along the row direction and positioned between the corresponding pixel and the pixel next to the corresponding pixel in the column direction such that the second part is connected to the first part and the third part.

3. A liquid crystal display device comprising a matrix substrate, the matrix substrate comprising a plurality of pixels arranged in a matrix including a plurality of rows and a plurality of columns, each of the pixels comprising a pixel electrode and a thin-film transistor, a drain of the thin-film transistor electrically connected to the pixel electrode, the matrix substrate further comprising a plurality scan line sets and a plurality of data line sets, wherein the scan line sets and the data line sets are insulated and intercrossed, each of the scan line sets comprises at least three scan lines extended along a row direction, each scan line of the at least three scan lines connected to a gate of the thin film transistor in the pixel of a corresponding row, each of the scan lines of the scan line sets receives a scanning signal simultaneously to turn on/off the thin-film transistor of the corresponding row, each of the data line sets respectively comprises a first data line, a second data line, a third data line, and a fourth data line, wherein a source of the thin film transistor of each of the pixels corresponding to a same column is connected to a corresponding data line of a same data line set, and the pixels electrically coupled to the same data line set are arranged in the same column, a part of data lines of each of the data line sets is extended along the column direction but is bended from one side of a corresponding pixel to another side of the corresponding pixel at a position between the corresponding pixel and a pixel next to the corresponding pixel in the column direction such that the thin film transistor of each pixel is connected to a nearest data line, wherein a first pixel, a second pixel, a third pixel, and a fourth pixel aligning along the column direction constitute a pixel set; the first data line is located at a first side of the pixel set; the second data line is at a second side of the pixel set and is bended from the second side to the first side at a position between the second pixel and the third pixel, and is bended from the first side to the second side of the pixel set at a position between the fourth pixel and a first pixel of another data set; the third data line is at the second side of the pixel set and is bended from the second side to the first side of the pixel set at a position between the third pixel and the fourth pixel, and is bended from the first side to the second side of the pixel set at a position between the fourth pixel and the first pixel of another data set; the fourth data line is located at the second side of the pixel set.

4. The liquid crystal display device of claim 3, wherein the part of the data lines at least comprises sequentially-connected a first part, a second part, and a third part, wherein the first part and the third part are respectively extended along the column direction and positioned on the two sides of the corresponding pixel, the second part is extended along the row direction and positioned between the corresponding pixel and the pixel next to the corresponding pixel in the column direction such that the second part is connected to the first part and the third part.

* * * * *